(12) United States Patent
Zou

(10) Patent No.: US 8,878,986 B2
(45) Date of Patent: Nov. 4, 2014

(54) WATER-PROOF CASING

(75) Inventor: Ning Zou, Austin, TX (US)

(73) Assignee: Ning Zou, Austin, TX (US)

( * ) Notice: Subject to any disclaimer, the term of this patent is extended or adjusted under 35 U.S.C. 154(b) by 0 days.

(21) Appl. No.: 13/567,007

(22) Filed: Aug. 3, 2012

(65) Prior Publication Data
US 2014/0036144 A1 Feb. 6, 2014

Related U.S. Application Data

(60) Provisional application No. 61/514,910, filed on Aug. 4, 2011.

(51) Int. Cl.
*H04N 5/225* (2006.01)

(52) U.S. Cl.
CPC .................... *H04N 5/2252* (2013.01)
USPC ............ 348/373; 348/374; 348/375; 348/376

(58) Field of Classification Search
USPC .................. 348/81, 83, 373–376; 396/25–27
See application file for complete search history.

(56) References Cited

U.S. PATENT DOCUMENTS 5,956,527 A * 9/1999 Dowe .............................. 396/25
8,457,481 B2 * 6/2013 Miglioli et al. ................. 396/27

* cited by examiner

*Primary Examiner* — Yogesh Aggarwal

(57) ABSTRACT

The water-proof casing provides a waterproof casing for protecting an electronic device. It comprises a housing that has an internal space, at least an opening that is positioned on a surface of the housing, and a cover portion that covers the opening. As the material for making the housing is stretchable, the house may has only a single opening that is stretched to allow an electronic device to pass through. The housing may enclose an electronic device, which enters the housing through the single opening. A flexible material is used to make the opening that is stretched when the electronic device enters the housing. The opening includes a skirt that is pressed against a surface of the cover portion so that the water-proof function of the present disclosure may be achieved. The casing may include a tube unit to accommodate lens of the device.

14 Claims, 5 Drawing Sheets

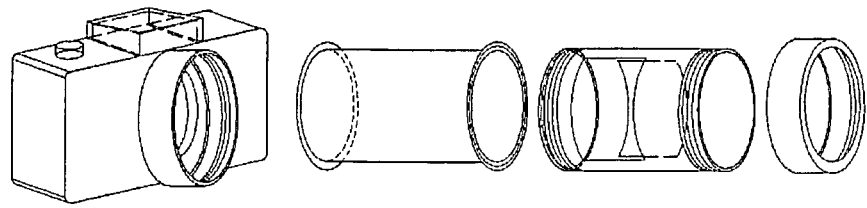
Figure 9
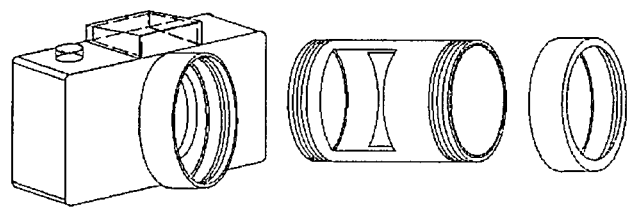
Figure 10
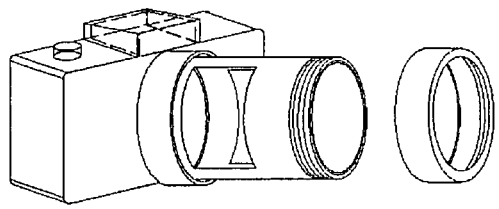
Figure 11
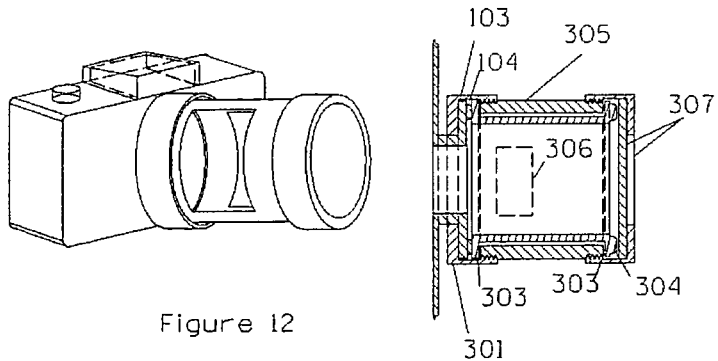
Figure 12
Figure 13

WATER-PROOF CASING

BRIEF DESCRIPTION OF THE DRAWINGS

FIG. 9 illustrates another embodiment of the water-proof casing.
FIG. 10 illustrates another embodiment of the water-proof casing.
FIG. 11 illustrates another embodiment of the water-proof casing.
FIG. 12 illustrates another embodiment of the water-proof casing.
FIG. 13 illustrates another embodiment of the water-proof casing.

1. FIELD OF THE INVENTION

Figure 1:
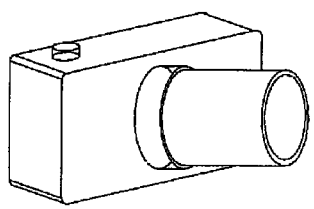
FIG. 1 illustrates an embodiment of the water-proof casing.
Figure 3:
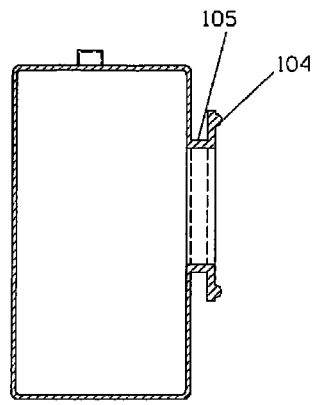
FIG. 3 illustrates another embodiment of the water-proof casing.

This non-provisional invention application is associated with the provisional application 61/514,910, which was filed on Aug. 4, 2011.

The present disclosure provides a waterproof casing for protecting an electronic device. More specifically, the present invention relates to a water proof casing may be used to preventing water from contacting with a digital camera, a digital single lens reflex camera, and a digital video camera during operation in a underwater, inclement weather, and surface water environment.

BACKGROUND OF THE INVENTION

A variety of devices have been invented to protect the imaging and video devices from the harmful environment while in use, say underwater, inclement weather, and surface water. The subject invention provides a series of devices for accommodating the uses mentioned above.

A review of the prior art reveals there are two types of waterproof devices, rigid casing vs. flexible casing. The first type generally proposes a rigid chamber to hold the imaging/video devices. This type of devices is generally pricy; primary because of a complicated structure, such as several build-in leak proof buttons, lens barrel, front and back cover, hinge, clamp and seal. The inner space of a rigid body is un-adjustable. Thus the device is generally model specific, which will also increase the design and manufacture cost. Some examples of this type of devices are summarized below:

Patent US 2005/0115852 A1 proposed a device with a rigid case to store a camera body. The rigid case has two port members to enclose the camera to provide protection. A conical barrel is attached to the case, which holds the lens. The barrel has a transparent window for image shooting.

U.S. Pat. No. 7,106,959 proposed a rigid waterproof case with control buttons. The rigid case has two port members to enclose the camera to provide protection. The front port member has a transparent window for image shooting. User controls the camera through the buttons on the case. The special designed camera can be powered off with lens barrel at projected state for shorter response time.

The second type uses flexible casing to hold the imaging/video devices. A flexible bag with a sealable opening is used to hold the device and provide protection when it is sealed. Another opening of the bag is attached to a port member with a transparent window for image shooting. This type of devices may be inconvenient to operate because the irregular inner space of the casing could not fit the device well and all operations have to be conducted through the relatively loose flexible casing. Some examples of this type of devices are summarized below:

U.S. Pat. No. 1,535,312 proposed a flexible bag with a transparent aperture for lens. The bottom of the bag has an opening. The camera is inserted into the bag through this opening. A draw string is installed at the edge of the opening has, which can be tightened to close the opening.

U.S. Pat. No. 2,537,303 proposed a flexible bag made of canvas/woven cloth with a transparent pan for camera lens. The camera is inserted into the bag through the back opening. A draw sting installed at the opening can be tightened to close the bag.

U.S. Pat. No. 3,036,506 proposed a tubular flexible casing with an opening on the end, which is sealed by a clamp after installing the camera inside the casing. There is a transparent pane on the other end for image shooting.

U.S. Pat. No. 4,033,392 proposed a transparent plastic enclosure with a front opening that can be sealed by installing a filter on the camera lens. The camera is inserted into the bag through the back opening, which is sealed by a Zip-Lock pressure lock closure.

U.S. Pat. No. 4,071,066 proposed a case with an opening, which can be sealed by a water proof zipper. When the camera body is installed, a water proof lens is installed on the camera body through another opening with an o-ring to seal the connection.

U.S. Pat. No. 4,176,701 proposed a casing made of thermal plastic film. The front opening of the casing has a transparent pane for image shooting. The camera is inserted into the case through one side opening with waterproof zipper, the opening is then closed. There is a rubber sleeve on the other side of the casing. Operator inserts his hand through the opening of the sleeve to operate the camera. The rubber sleeve surrounds the operator's arm tightly for seal.

U.S. Pat. Nos. 4,771,299 and 5,159,366 proposed a flexible housing with a transparent pane for image shooting. The opening for camera installation is then sealed by a clamp. An inflated balloon/cylinder/auxiliary air volume/scuba system with pressure regulator is attached to the casing for pressure control.

U.S. Pat. No. 7,653,291 proposed a transparent casing made of flexible material with a transparent light tube surrounding by rubber case on the front for image shooting. The side of the casing has an opening for camera installation. The opening is sealed by a Zip-Lock pressure lock closure plus a corrugated header.

2. DETAILED DESCRIPTION OF WATER-PROOF CASING FOR GENERAL DIGITAL DEVICES

The housing of the present disclosure may use any material that is transparent and flexible. The materials include, but not limited to, transparent silicon rubber, transparent nanotube films, and transparent thermoplastic polyurethane. For example, the extension range of silicon rubber strip can be as high as 500%. The material used in this disclosure is preferred to have an extension range of 50% or higher. The material used in this disclosure also should be transparent enough to provide clear views of the LCD display, view finder, and control buttons. Because the housing material is stretchable, control portions of an electronic device are still operable through the material when the electronic device is in the housing.

The housing of the water-proof casing of the present disclosure may have different shapes, which includes, but not limited to, rectangular cuboid, a rectangular cuboid with some modifications, such as a cylinder chamber on top of it, or a designated shape for a specific model of a digital device. A rectangular cuboid shaped housing may have relatively low producing cost. The rectangular cuboid shaped housing with a cylinder chamber may be more expensive, while it provides a designated space for control wheels of some devices. Thus the operability is improved. These two types of casing may be used on a series of models with slight different sizes because of the elasticity of the housing. The designated housing fits with the specific model well and provides the best operability.

The thickness of the stretchable housing and the tube may range from 0.05 cm to 0.5 cm. Thicker housing has better durability comparing to vinyl or plastic (typical maximum thickness is 0.03 cm).

FIG. 1 is a perspective view showing an embodiment of the water-proof casing for digital devices for underwater operation in accordance with the present disclosure.

Figure 2:
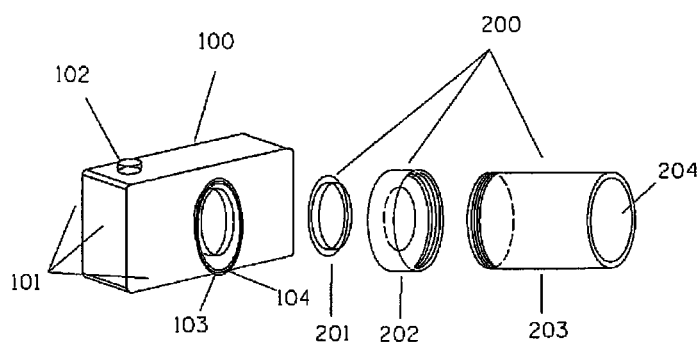
FIG. 2 illustrates another embodiment of the water-proof casing.

FIG. 2 is a perspective view showing an embodiment of the water-proof casing for digital devices in accordance with the present disclosure, in which is expressed in a resolved form.

The housing unit 100 shown in FIG. 2 represents a stretchable waterproof housing. Housing 100 has transparent walls 101 to hold the device. The walls allow operator to view the contents of the LCD or view finder of the installed device. Operations on the buttons may be complied through the transparent wall 101. The housing may have a designated chamber 102 to accommodate the control wheel of the device. Operations on the control wheel may be complied through the chamber. The size of the inner space of the housing might be similar to or slightly smaller than the installed device, thus the device will not move in the housing after installed, which will enhance the operability.

An opening is provided on the front wall of the housing. The electrical device may be installed into the housing through the opening which it is stretched. The opening shape may be round, since the camera lens has a cylinder shape. The opening may be ellipsoid, rectangular, square or any other appropriate shape, which may make the device installation easier.

The front opening has a skirt 103, a build-on shoulder 104 and a neck 105. The skirt is to be pressed against the end of the cover portion so that the water-proof function of the present disclosure may be achieved. The shoulder on the skirt provides enhanced seal between the skirt and the cover portion. The shape of the cross section of the shoulder may be semi-circle, rectangular, triangle, or trapezoid. The neck provides space to install the plastic cap 202.

A cover portion 200 includes an internal support 201, a cap 202, and a lens barrel 203 with a transparent pane 204 on the front end, which provides a window for image/video shooting.

Since the housing might be stretched when the device is installed, an internal support 201 is designed to keep the opening in its original shape from deformation. It may be made of plastic, metal or any other material which can provide enough support.

The plastic cap 202 has an opening on the back and inner thread on the sidewall. The bottom of the cap is slightly bigger than the skirt 103, and the back opening of the cap has the same shape of the neck 105. The lens barrel 203 has outside thread on the sidewall, the inner diameter and the transparent pane is big enough to provide a big enough window for shooting image/video. The length of the lens barrel should provide sufficient space for the lens when it is projected from the body of the installed device.

The first step of the assembly process is to install the electronic device into the housing through the front opening.

Figure 4:
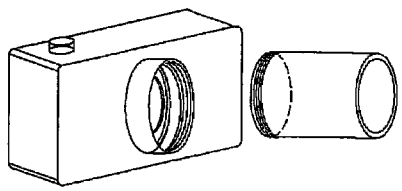
FIG. 4 illustrates another embodiment of the water-proof casing.

After the electrical device is installed, the internal support 201 is then installed if needed (in case the housing is stretched and the opening is deformed). The third step is to install the plastic cap 202 on the housing by pulling out the skirt 103 through the back opening of the cap 202. FIG. 4 shows the manner that the internal support and the cap are installed on the housing.

Figure 6:
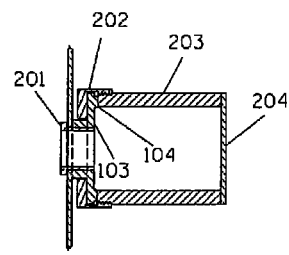
FIG. 6 illustrates another embodiment of the water-proof casing.
Figure 5:
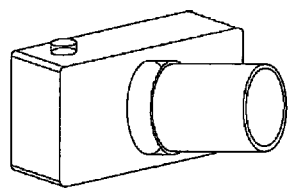
FIG. 5 illustrates another embodiment of the water-proof casing.

The last step is tightening the lens barrel 203 on the plastic cap 202, which will press the skirt 103 on the open end of the lens barrel 203. The shoulder 104 is squeezed onto the back end of the lens barrel 203 to provide enhanced seal at the connection. FIG. 5 shows the preferred embodiment. And FIG. 6 shows the cross-sectional view of the connection.

All parts of the casing described above may be produced with casting process. First the material is melt into liquid format with heat. Then the liquid is injected into a mold, whose inner space will form the liquid into the desired shape. As long as the liquid is cooled down and solidified, the mold is opened and the producing process is finished. A person of ordinary skill in the art would know that any manufacturing processing that may handle the materials and produce the shapes in the present disclosure may be used.

3. WATERPROOF CASING FOR SINGLE LENS REFLEX DIGITAL CAMERAS

The water-proof casing introduced in Section 2 may also accommodate single lens reflex digital camera ("SLR camera") with several modifications. The modified casing is described in detail in this section.

Figure 7:
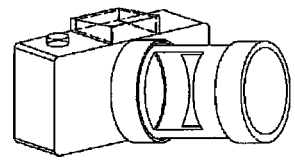
FIG. 7 illustrates another embodiment of the water-proof casing.

FIG. 7 is a perspective view showing an embodiment of the water-proof casing for adapting SLR cameras with build-in flash and zoom lens for underwater operation in accordance with the present disclosure.

Figure 8:
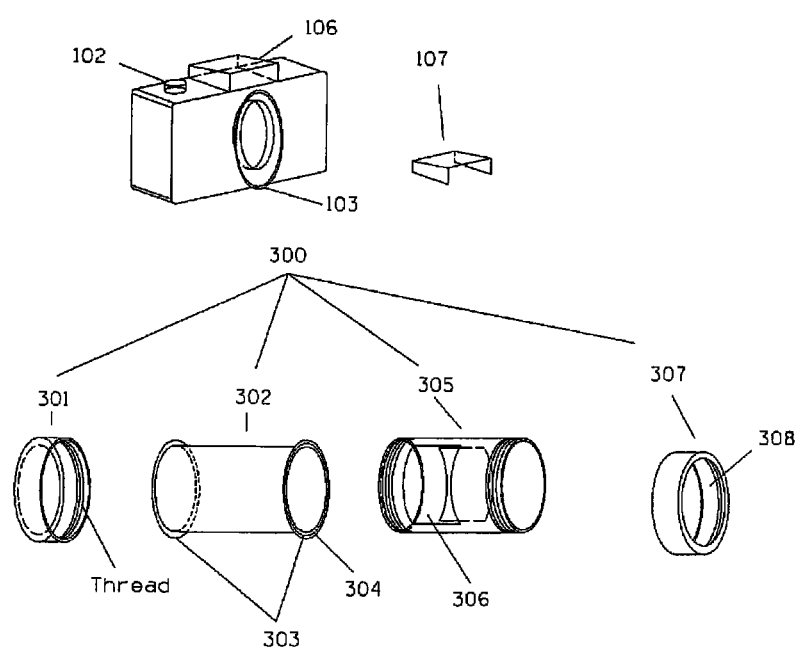
FIG. 8 illustrates another embodiment of the water-proof casing.

FIG. 8 is a perspective view showing an embodiment of the water-proof casing for adapting an SLR with build-in flash and zoom lens in accordance with the present disclosure, in which is expressed in a resolved form.

FIG. 9 is a perspective view showing the inner support installed for the build-in flash chamber.

FIG. 10 is a perspective view showing the plastic cap is installed on the housing.

FIG. 11 is a perspective view showing the stretchable lens tube is installed inside the plastic socket.

FIG. 12 is a perspective view showing the lens tube and the plastic socket are attached on the housing skirt tightly by the skewed manner between the back cap and the plastic socket.

FIG. 13 is a perspective view showing the front cap with transparent pane is attached on the front skirt of the lens tube tightly by the skewed manner between the front cap and the lens tube.

Figure 14:
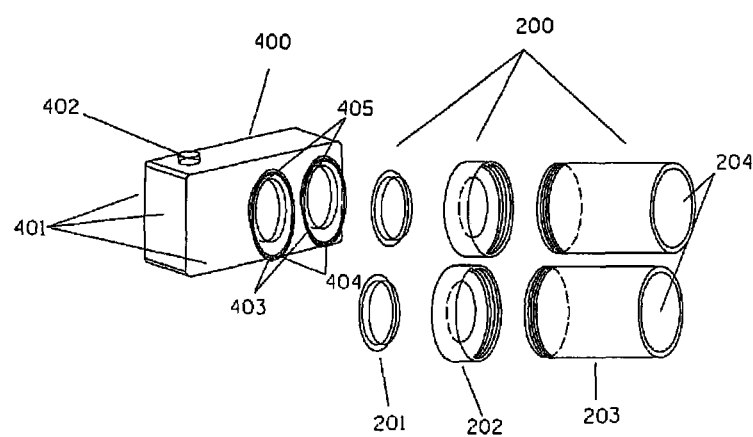
FIG. 14 illustrates another embodiment of the water-proof casing.

FIG. 14 is a vertical cross-sectional view showing of the assembled casing for SLR camera.

FIG. 7 shows an embodiment to accommodate the SLR cameras with build-in flash and zoom lens. There are several modifications on the waterproof housing comparing with that in FIG. 1. Firstly, a flash chamber 106 on the top of the housing provides sufficient space for the build-in flash at pop-up state. Secondly, a flash chamber support 107 is installed into it to prevent possible deformation caused by water pressure, which is shown in FIG. 9.

The flash chamber support 107 shown in FIG. 8 may be made of plastic, metal or other material, which could provide enough support to prevent the chamber from deformation caused by the pressure of water.

In order to operate zoom lenses, a flexible lens tube 302 is designed. The selection of the material is same as the waterproof housing. Both ends of the tube 302 have skirts 303 to attach with the housing skirt 103 and the front cap 307, respectively. The front skirt 303 has a built-on shoulder 304 to provide enhanced seal between the tube 302 and the front cap 307. The back cap 301 is same as cap 202 described in previous section. The Front cap has inner thread on the sidewall and a transparent pane 308, which provides a window for image/video shooting.

Socket 305 is designed to hold the lens tube 302. The inside diameter of socket 305 should be slightly bigger than the outside diameter of lens tube 302. The length of tube 302 should be slightly longer than socket 305. When the tube 302 is installed into socket 305, the two skirts on the tube needs to be pulled out from both ends of socket 305. The length of the lens tube 302 may slightly longer than the length of the zoom lens when it is fully projected. The body of the socket 305 has several openings 306, and the lens zooming operations may complied by twisting the lens tube 302 through these openings. The socket 305 has outside threads on both ends, which is to tighten to the back cap 301 and front cap 307. These two connections will press the skirts 303 on the housing skirt 103 and front cap 307 tightly to provide seal. The socket also provides support to the camera lens tub 302 to prevent it being compressed by water pressure.

The first step of the assembly process is to install flash support 107 into the flash chamber through the front opening of the housing.

After the support is installed, the SLR camera is then installed through the front opening of the housing. The next step is to install the plastic cap 301 on the housing by pulling out the skirt 103 through the back opening of the cap 301. FIG. 9 shows the manner that the flash support and the cap are installed on the housing.

The next step is to insert the tube 302 into the socket 305, and pulling the two skirts out from the both ends of the socket, which is shown in FIG. 10.

By tightening the socket 305 on the plastic cap 301, the connection between the housing skirt 103 and the back side tube skirt 303 are sealed. The shoulder 104 is squeezed on the tube skirt 303 to provide enhanced seal at the connection. FIG. 11 shows the preferred embodiment.

The front connection between front cap 307 and the socket 305 are sealed by tightening the front cap 307 on the socket 305. The shoulder 304, which is located on the front skirt 303, is pressed onto the cap 307 to provide enhanced seal at the connection. FIG. 12 shows the preferred embodiment. FIG. 13 provides a vertical cross-sectional view of the connections.

Similarly, all parts of the casing described above may be produced through casting process. First the material is melt into liquid form with heat. Then the liquid is injected into a mold, whose inner space will form the liquid into the desired shape. As long as the liquid is cooled down and solidified, the mold is opened and the production process is finished.

4 WATERPROOF CASING FOR 3-D DIGITAL CAMERAS/CAMCORDER

The water-proof casing introduced in Section 2 may also accommodate 3-D digital camera/camcorder with modifications. A modified casing is described in detail in this section.

Generally, 3-D digital cameras/camcorder has dual lens system to shoot image/video from different angles simultaneously. The structure of modified housing unit 400 shown in FIG. 14 is similar to unit 100 shown in FIG. 2. A difference is that it has two front openings to install two sets of cover potion. According to other embodiments, the modified housing may have a single opening whose shape is similar with that of the lens unit of a 3-D digital camera/camcorder.

A 3-D camera/camcorder may be installed into the housing through one opening by stretching that opening. Each of the front openings has a skirt 403, a build-on shoulder 404 and a neck 405 whose functions are similar to those of skirt 103, build-on shoulder 104 and a neck 105.

A cover portion 200 is same as that described in Section 2. Two sets of cover portion are used in this application.

The first step of the assembly process is to install the electronic device into the housing through one of the front opening.

There are two sets of cover potion need to be installed; the installation process is the same.

What is claimed is:

1. A waterproof casing for an imaging/video device, comprising:
   a) A housing is made of transparent and stretchable material;
   b) A designated chamber on an upper side of the housing to accommodate the control wheel of the device;
   c) An opening on a front side of the housing, where the camera can be installed into the housing;
   d) A skirt on the front opening with a shoulder for better seal;
   e) A rigid lens barrel with a transparent pane on one end, and an opening on the other end with outside thread.

2. A waterproof casing according to claim 1, which comprises an internal support mounted on the opening of the housing to provide support.

3. A waterproof casing according to claim 1, where the opening side of the rigid lens barrel is attached to the skirt of the housing.

4. A waterproof casing according to claim 1, which comprises a cap with an opening on the center, and inner thread.

5. A cap according to claim 4, is tightened on the lens barrel from the back of the skirt of the housing by a screw type connection.

6. A waterproof casing for a single lens reflex digital camera, which comprises of:
   a) a housing is made of transparent and stretchable material;
   b) a designated chamber on the upper side of the housing to accommodate the control wheels of the device;
   c) an opening on the front side of the housing, where the camera can be installed into the housing;
   d) a skirt on the front opening with a shoulder for better seal;
   e) a housing with a chamber and a support for the build in flash;
   f) a socket with several openings on the body and threads on both sides.

7. A waterproof casing according to claim 6, which comprises a flexible lens tube with skirts on both sides, the front skirt has a shoulder for better seal.

8. A waterproof casing according to claim 6, which comprises a front cap with transparent pane and inner thread.

9. A waterproof casing according to claim 6, which comprises a cap with an opening on the center, and inner thread.

10. A method of using a single lens reflex digital camera with the casing according to claim 6, the method comprising the steps of:
   a) inserting the camera into the opening of the housing;
   b) inserting the flexible lens tube into the socket;
   c) installing the back cap on the opening of the housing;
   d) tightening the back cap on the socket and the tube by the screw type connection;
   e) tightening the front cap on the socket and the tube by the screw type connection.

11. A waterproof casing to hold a 3-D camera, which comprises of:
   a) a housing is made of transparent and stretchable material;
   b) a designated chamber on the upper side of the housing to accommodate the control wheel of the device;
   c) two openings on the front side of the housing, where the camera can be installed into the housing from one of them;
   d) a skirt on the each of the front opening with a shoulder for better seal.

12. A waterproof casing according to claim 11, which comprises two internal supports mounted on each of the said opening of the housing to provide support.

13. A waterproof casing according to claim 11, which comprises two rigid lens barrels with outside thread, attached to the two skirts of the housing.

14. A waterproof casing according to claim 11, which comprises two caps with inside thread, are tightened on the two lens barrels from the back of the skirt of the housing by the screw type connection.

* * * * *